Patented Aug. 28, 1945

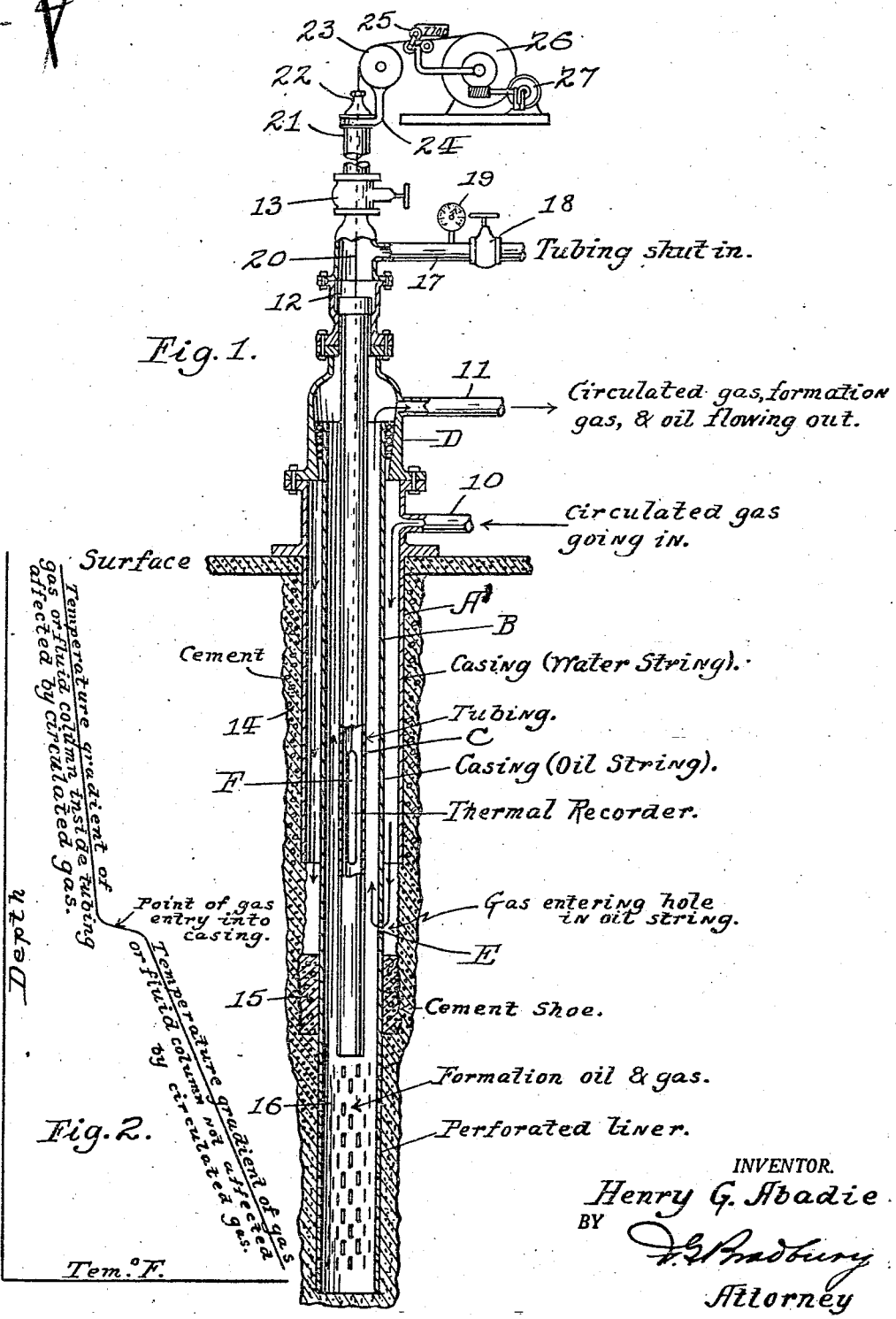

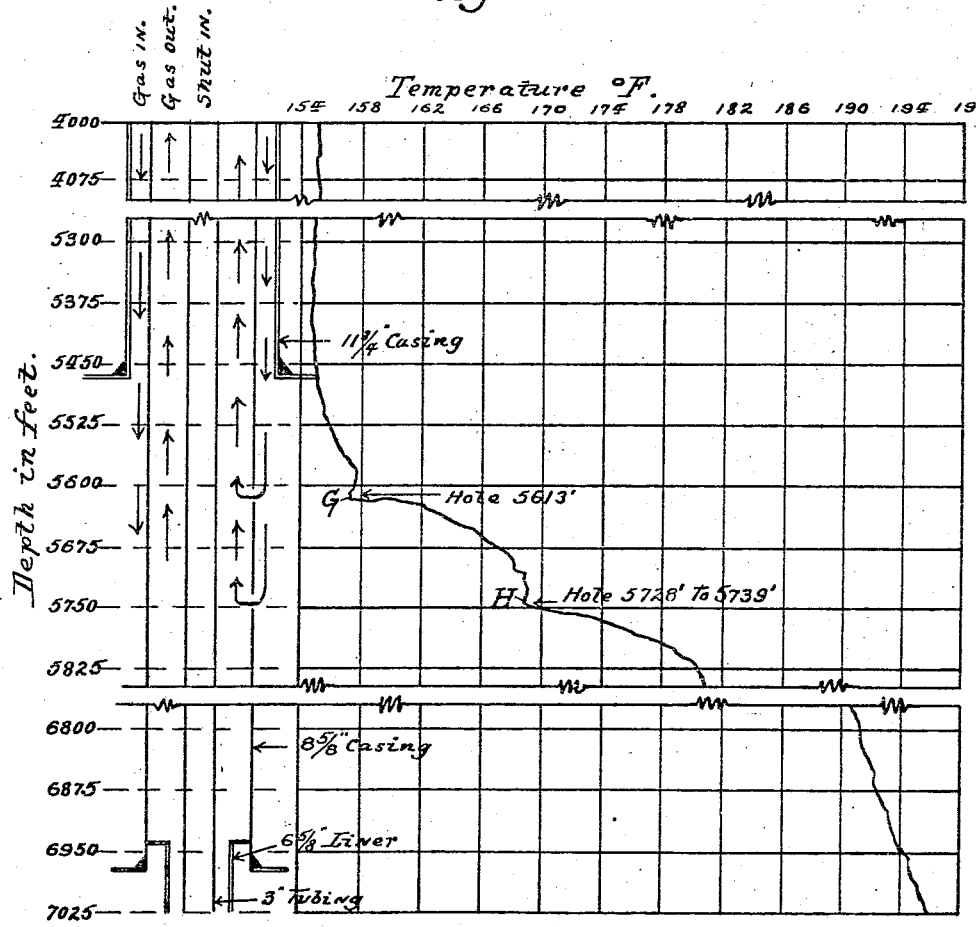

2,383,455

UNITED STATES PATENT OFFICE 2,383,455

METHOD AND APPARATUS FOR LOCATING LEAKS IN WELLS

Henry G. Abadie, Kettleman North Dome Hills, Calif., assignor of one-half to Frederick G. Bradbury, Los Angeles, Calif.

Application November 28, 1942, Serial No. 467,239

4 Claims. (Cl. 137—77)

My invention relates to an improved method and apparatus for locating leaks in wells. More particularly the invention provides means by which leaks caused by cracks, holes or other passages at unknown depths can be located in the casing, tubing or other ducts employed in oil, gas or other types of wells.

An object therefore of this invention is to provide a precise and dependable method and simple and effective apparatus by which leaks in the casing, tubing or other ducts of oil, gas or other types of wells can be quickly and accurately determined at a minimum of expense and hazard. A particular advantage attained by my invention is a considerable saving in cost of repairing wells when leaks occur. Further objects and advantages will be apparent from the following description and the drawings forming part thereof, in which Fig. 1 is a diagrammatic view of an oil well showing the manner in which my improved method is applied and an apparatus by which the improved method can be carried into practice for locating leaks, one of the leaks being indicated in a duct which is usually termed the casing oil string; Fig. 2 is an idealized diagrammatic view, illustrating the application of my improved method; and Fig. 3 is a diagram showing a thermal survey of an actual run made by the application of my improved method.

In mines and oil wells the increase of temperature with depth is an established fact. This substantially uniform increase of temperature is known as the geothermal gradient. This gradient varies in different areas and it is known to vary in different sections of the same field. However, in any one area there is little variation in the rate of temperature change from the surface to the maximum recorded depth. In many of the thermal surveys it has been observed that these irregularities in the temperature gradient occur. These variations can usually be correlated with interbedded shales and sands. The reason for these variations is usually due to the conductive nature of the sediments and the fluids or gases contained therein. These sediments in contact with the mud column are either at a higher or lower temperature than the mud column at the point of contact. Therefore, the conductive nature of the sediments determines the manner in which the temperature gradient gradually resumes the normal geothermal gradient in any particular area under observation. The temperature gradient when the well is placed on production will be found to vary. Over limited distances the gradient will approximate a straight line but the fluids that enter the well will have a marked effect on the temperature gradient opposite the point of entry of gas, oil and water due to their different specific heats, and in the case of gas the cooling which results from expansion, the influence of which is carried upward by the rising column of fluid.

My approach to the problem of locating leaks in the various ducts employed in a well has been to alter or change the above flowing or geothermal gradient, depending whether the well is flowing or shut in. Essentially, the idea is to precondition the well so as to induce or cause a decided temperature change at the point of the leak of such magnitude that it may be recorded, and to visually indicate such changes and their depth in the well. Temperature changes, which I term temperature anomalies, adjacent to leaks in wells are effectively indicated by introducing extraneous gas, water, or oil into or between the strings of casing or tubing in the well to establish equilibrium temperatures. This means that the fluid which is introduced into the well is caused to circulate in the well, that is return to the surface through another path and through the leak. Or, if it cannot return to the surface, and it can be forced away through the leak back into a porous formation the same effect may be obtained. This increased anomaly produced by my invention is precise, decided and sufficient to enable accurate recording for practical purposes as to variation in degree of temperature and depth of location in the well.

In practice, gas has been found to be a good circulating medium to produce equilibrium temperatures and to induce a temperature anomaly at the leak. Water can be employed as a circulating medium but the introduction of water in an oil or gas well has been found objectionable as it can damage the productive sands. Also oil can be employed but from experience it has been found difficult to circulate oil through an extremely small leak in the casing. Then too, in a large percentage of wells the formation pressure is so low that it cannot support a column of fluid in the well. However, gas is frequently more easily available and by the use of a small compressor it is possible to quickly increase the pressure of gas to the desired point where it can be forced into and circulated through the well for the purposes above specified.

In Fig. 1 of the accompanying drawings, two strings of casing are shown, the outer casing A, termed the water string, and the inner casing B, termed the oil string. A string of tubing C is shown within the oil string. These ducts are shown assembled and mounted in a suitable head fitting D above the surface and incorporated into what is commonly known as the annulus of the well, which separates the ducts and provides an ingress duct 10, entering the space between the water string and the oil string, an egress duct 11 emerging from the space between the oil string and the tubing, and a service duct 12 connected with the upper end of tubing C and shown controlled by the hand operated shut off valve 13. The service duct is shown provided with a flow line 17, which is controlled by a suitable shut off valve 18 and provided with a pressure indicator 19. The water string A is cemented at 14 in the ground and the lower end of the oil string B is shown cemented at 15 above the top of the perforated lower end 16 which is juxtaposed to the oil and gas formation. These parts are all of usual type such as are employed in oil well practice.

For a hypothetical illustration of my invention, let it be assumed that there is a failure through a leak such as E, of unknown depth in the well. The attendant is aware of some fact that leads one to believe that a leak exists in the water or oil string or tubing as the case may be and it is imperative to know the approximate source in order to effect a repair. The well is first shut in by closing the valve 18 in the flow line 17. Gas pressure is applied at field line or compressor discharge temperature to the annulus of the water and oil string at the surface of the ingress duct 10. This gas pressure preconditions the well and depresses the fluid, if present, in the annulus, either forcing part of it back into some permeable sand or fractured shale or all of it through the leak E, into the inside of the oil string. Eventually the top of the fluid is depressed to the level of the leak and gas starts flowing through the leak. After sufficient gas has passed through the leak the column of fluid on the inside will be lightened to the point where the gas and fluid will start to rise. Finally, a point is reached where the gas and fluid reaches the surface. The lightening of the fluid column on the inside may induce the well to flow. If the well flows it will affect the temperature anomaly at the leak, however it doesn't obscure the results if sufficient gas is circulated. The gas should be circulated for a sufficient period to establish equilibrium temperatures in the ducts of the well and a decided temperature anomaly at the location of the leak. The period may range over several hours and preferably until a maximum volume of gas is being circulated through the leak. In practice this period has been from six to twenty-four hours. In general, there will be a large pressure drop across the leak in the casing and this results in a relatively large temperature drop which causes a cooling of the casing at this point. In the illustrated case shown in Fig. 1, if the temperature change at the leak is sufficient there will be an absorption of heat from the tubing at and above the point of entry.

In the practice of my invention a suitable thermal recorder, such as F, attached to a sounding or lead line, such as 20, is placed in the upper end of the tubing C. This recorder is lowered through the tubing in the well after the latter has been preconditioned. A suitable lubricator 21 is attached to the outer end of the valve 13, with line 20 passing therethrough. The lubricator permits the line to travel freely in and out of the well while effecting substantially a complete pressure seal by the packing gland 22 at the top thereof. The valve 13 is preferably opened slowly to admit pressure from the well into the lubricator and to permit the recorder to be lowered slowly through the tubing. The lubricator carries its own sheave 23 which is mounted by the bracket 24 thereon and functions to align the sounding line. A three point odometer 25 is directly controlled by contact to measure the travel of the line and gauge the depth of the recorder in the well. The thermal recorder may be of any usual type. One type of recorder which may be employed is a self contained unit which automatically and continuously records temperature in synchronism with the rate at which it is lowered into the well, the rate of feed being correlated with the temperature recorded. Another type is that which provides continuous recording of temperature, the record made being visible at the surface of the well while making a run. The lowering of the recorder is by any suitable means, such for illustration as the motivated reel 26, which is driven by a prime mover such as the internal combustion engine 27. This reel is controlled to expend the line at regular speed, by any suitable reduction mechanism, not shown, the time element being correlated with the record made by the recorder as above stated, whereby the depth in the well at which the temperature is recorded can be determined during or after the recording operation. Any fluid inside the tubing facilitates the transfer of heat to the recorder and at the same time minimizes lag in recording variations of temperature. It is to be understood that Fig. 1 of the drawings illustrates the apparatus above described only diagrammatically.

A typical thermal survey illustrating the practice of my invention is shown by Fig. 2 of the drawings and illustrates by the graphical record, when compared with the well illustrated in Fig. 1, the location of a leak. It will be noted that the results are direct and very simple to interpret, which is a distinct advantage. These direct results are due to the precise and decided temperature anomaly produced by the controlled conditions in the well. In general thermal work this is not usually the case and often the survey is difficult to interpret. It will be observed that the recording of the temperature anomaly is correlated with the thermal gradient of the fluid above and below and that variations in temperature of the anomaly itself disclose decided temperature characteristics which may be employed as determining factors for various uses in a well.

Wells usually employ several strings of casing. By shutting in portions of the tubing or strings of casing in any well and circulating fluid under sufficient pressure in the manner stated, my improved method and apparatus are applicable within the skill of the operator for locating the intrusion of water or other leaks. The determination of the depth of a leak in a well has in the practice of my invention been sufficiently close for all practical purposes. In tests made at varying depths I have found my improved method and apparatus to be successful, inexpensive and to require a minimum of time in determining the location of leaks.

My method and apparatus are also applicable for locating more than one intrusion of water or other leak by a single run of a thermal recorder or indicator in a well as is illustrated by the survey diagram in Fig. 3, which is substantially a reproduction of a record made in a preconditioned well. It will be noted that two decided temperature changes G and H were produced simultaneously in the well by the circulation of gas under pressure through the ducts in the well and that a single recording operation gauged the depths of the leaks within a few feet.

The recording of temperature variations can also be made by moving the recorder from the bottom of the well upwardly and it is within the spirit of the invention to make this and other modifications in practice.

In accordance with the patent statutes, I have described the principles of operation of my invention together with the apparatus and mode of operation which I now consider to represent the best embodiment thereof, but I desire to have it understood that the invention can be variously modified and applied to uses other than those above set forth, within the spirit thereof and within the scope of the following claims.

I claim:

1. The method of locating a leak in a duct between outer and inner chambers within the bore of a well, comprising, injecting a comparatively large volume of gas from a controlled outside source into one of said chambers under sufficient predominant pressure so as to overcome formation pressure of fluid, establish equilibrium temperatures in said chambers, discharge through said leak and induce a temperature anomaly adjacent thereto, and measuring the temperature gradient of the well including the temperature anomaly.

2. The method of locating a leak at unknown depth in a duct between outer and inner chambers within the bore of a well, comprising, closing in the well and injecting into one of said chambers and through said leak into the remaining chamber a sufficient volume of gas from an extraneous source at sufficient predominant pressure so as to overcome formation pressure of fluid, induce equilibrium temperatures in said chambers and a temperature anomaly adjacent to said leak, and measuring the temperature gradient of the well including said induced temperature anomaly.

3. The method of locating a leak at unknown depth between outer and inner chambers within the bore of a well, comprising, closing one of said chambers, forcing gas into said closed chamber from an extraneous source and through said leak into the companion chamber in sufficient quantity and at sufficient predominant pressure to overcome formation fluid pressure and induce a decided temperature anomaly adjacent to said leak, and measuring the depth of said temperature anomaly in the well.

4. The method of locating the depth of a leak between outer and inner substantially closed chambers in the bore of a well, comprising, circulating gas from the surface above the well under sufficient predominant pressure to overcome formation fluid pressure through said leak until a state of equilibrium is produced in said chambers and gas under sufficient pressure and in sufficient quantity is released through said leak to produce a decided temperature change adjacent thereto, measuring the temperature at varying depth including that of the leak in the bore of the well, and correlating the temperature measured in the well with depth to deduce the depth of said leak by said induced change in temperature.

HENRY G. ABADIE.